United States Patent
Eden et al.

(10) Patent No.: US 8,285,639 B2
(45) Date of Patent: Oct. 9, 2012

(54) LOCATION BASED AUTHENTICATION SYSTEM

(75) Inventors: Tomer Eden, Netanya (IL); Boaz Avigad, Tel Aviv (IL)

(73) Assignee: mConfirm, Ltd., Tel Aviv (IL)

( * ) Notice: Subject to any disclaimer, the term of this patent is extended or adjusted under 35 U.S.C. 154(b) by 28 days.

(21) Appl. No.: 11/994,977

(22) PCT Filed: Jul. 5, 2006

(86) PCT No.: PCT/IL2006/000775
§ 371 (c)(1),
(2), (4) Date: Jan. 7, 2008

(87) PCT Pub. No.: WO2007/004224
PCT Pub. Date: Jan. 11, 2007

(65) Prior Publication Data
US 2008/0222038 A1    Sep. 11, 2008

Related U.S. Application Data

(60) Provisional application No. 60/695,893, filed on Jul. 5, 2006, provisional application No. 60/702,605, filed on Jul. 27, 2005.

(51) Int. Cl.
*G06Q 40/00* (2006.01)
(52) U.S. Cl. ............... 705/39; 705/35; 705/40; 705/44
(58) Field of Classification Search ............ 705/35–38, 705/39–40, 44
See application file for complete search history.

(56) References Cited

U.S. PATENT DOCUMENTS

| | | | |
|---|---|---|---|
| 6,097,938 | A | 8/2000 | Paxson |
| 7,379,916 | B1 * | 5/2008 | Mizrah ........................ 705/44 |
| 2002/0073044 | A1 | 6/2002 | Singhal |
| 2002/0143655 | A1 * | 10/2002 | Elston et al. .................. 705/26 |
| 2003/0061163 | A1 | 3/2003 | Durfield |
| 2003/0135470 | A1 | 7/2003 | Beard |
| 2003/0169881 | A1 | 9/2003 | Niedermeyer |
| 2003/0191709 | A1 * | 10/2003 | Elston et al. .................. 705/40 |
| 2003/0225651 | A1 | 12/2003 | Chen |
| 2004/0073519 | A1 | 4/2004 | Fast |

(Continued)

FOREIGN PATENT DOCUMENTS
WO    96/41488 A1    12/1996
(Continued)

OTHER PUBLICATIONS

Brooks, Charles Marcine. Store Choice and Trip Chaining Behavior: A transacton utility model and a GIS based site application. Georgia State University, 1996, 186 pages; AAT 9639127 (Abstract).*

*Primary Examiner* — Jason Dunham
*Assistant Examiner* — Nancy Mehta
(74) *Attorney, Agent, or Firm* — Myers Wolin, LLC (57) ABSTRACT

An improved location based authentication (LBA) system for detecting fraudulent transactions committed by means of misuse of payment cards is disclosed. The improved LBA system performs a series of transaction analysis and generates a fraud-score which provides an indication as whether to authorize an attempted transaction. The system is designed to increase profitability of credit card companies by reducing the accumulated losses due to fraud. In one embodiment, the system detects fraud by analyzing the behavior patterns of card holders and merchants.

6 Claims, 7 Drawing Sheets

U.S. PATENT DOCUMENTS

| | | |
|---|---|---|
| 2004/0079499 A1 | 9/2004 | Eden |
| 2004/0242201 A1 | 12/2004 | Sasakura et al. |
| 2005/0027543 A1 | 2/2005 | Labrou et al. |
| 2005/0027667 A1 | 2/2005 | Kroll |
| 2005/0065875 A1 | 3/2005 | Beard |
| 2005/0133588 A1 | 6/2005 | Williams |
| 2006/0064392 A1* | 3/2006 | Glisson .......................... 705/75 |
| 2006/0149671 A1* | 7/2006 | Nix et al. ........................ 705/40 |
| 2006/0237531 A1* | 10/2006 | Heffez et al. ................. 235/382 |
| 2007/0250440 A1* | 10/2007 | Paulsen et al. ................. 705/39 |
| 2007/0250441 A1* | 10/2007 | Paulsen et al. ................. 705/39 |
| 2008/0262935 A1* | 10/2008 | Baumgartner et al. ......... 705/17 |
| 2011/0035278 A1* | 2/2011 | Fordyce et al. ............ 705/14.49 |
| 2011/0035288 A1* | 2/2011 | Clyne ........................ 705/14.71 |
| 2011/0302011 A1* | 12/2011 | Yoder et al. ................ 705/14.17 |
| 2012/0005019 A1* | 1/2012 | LeBlanc et al. ............ 705/14.53 |

FOREIGN PATENT DOCUMENTS

WO      2004/079499 A2      9/2004

* cited by examiner

LOCATION BASED AUTHENTICATION SYSTEM

REFERENCE TO RELATED APPLICATIONS

This application claims the benefit of U.S. Provisional Patent Application No. 60/695,893 filed on Jul. 5, 2005 and U.S. Provisional Patent Application No. 60/702,605 filed on Jul. 27, 2005, are wholly incorporated herein by reference.

REFERENCES CITED

Patents and Published Applications

| U.S. Pat. No. 6,097,938 | August 2000 | Paxson |
| US 20020073044 | June 2002 | Singhal |
| US 20030061163 | March 2003 | Durfield |
| US 20040073519 | April 2004 | Peder |
| US 20040242201 | December 2004 | Toyoki; et al. |
| US 20050027543 | February 2005 | Yannis; et al. |
| US 20050065875 | March 2005 | Beard |
| US 20050027667 | February 2005 | Kroll |
| PCT/IL2004/000224 | March 2004 | Eden; et al. |

FIELD OF THE INVENTION

The present invention relates generally to location based authentication (LBA) systems, and more particularly to the use of location based authentication in fraud assessment.

BACKGROUND OF THE INVENTION

In recent years, payments using a credit card instead of cash payments have become widespread, thus avoiding the dangers of carrying large amounts of money in the form of cash. However, theft or forgery of cards is also increasing rapidly and thus suitable countermeasures to this are extremely important. Many solutions have been proposed for ensuring against fraudulent use of stolen and forged credit and cash cards. These solutions include limited withdrawals, time limits for availability of credit cards, duplicate encryption, and identification of card owners, to name a few. Identification is performed by means of PIN codes, fingerprints, one-time passwords, and so on. Still against the increasing of card related crime, these traditional security solutions are insufficient.

Location based authentication (LBA) systems provide an improved solution for preventing fraudulent transactions made using credit or cash cards. Examples of such LBA systems may be found in WO 02/052879 (also published as US 2004/0073519 and WO 03/058936 (also published as US 2004/0242201), published US patent application Nos. US 2003/0135470 and US 2005/0065875 as well as in U.S. Pat. No. 6,097,938, each of which is incorporated herein by reference for their useful background descriptions of the state of the art heretofore. Generally, a LBA system detects fraudulent transactions by verifying the user's presence at the place of transaction. Specifically, the LBA system evaluates the authenticity of a user's requests by retrieving the location of a transmitting and receiving device, such as a mobile phone, carried by the user and comparing it with the location of a point of sale (POS) terminal (or a cash-withdrawal terminal). If the terminal and mobile phone are located within a calculated and acceptable distance the transaction is approved. The location of the user is retrieved from the mobile network while the terminal location is considered fixed.

LBA systems provide a higher level of security over traditional solutions; however, they fail to provide a reliable means of identifying fraudulent transactions. One of many reasons for this inability is that fraud identification is based solely on the geographical distance between the merchant's terminal and the user's mobile phone. In addition, LBA systems are not designed to track changes in merchants' locations or in the coverage of a cellular network. Accordingly, prior art LBA systems typically generate a large number of false alarms and thus cannot be considered a reliable solution for the detection of frauds committed using stolen cards.

It would be, therefore, advantageous to provide an improved LBA system that accurately detects fraudulent transactions It would be further advantageous if the provided system would detect fraudulent transactions based on behavior patterns of cards holders and merchants.

SUMMARY OF THE INVENTION

According to a first aspect of the invention, there is provided a computer-implemented method for determining a fraud score associated with a monetary transaction facilitated using a payment card in a store, the method comprising:

receiving data representative of an incoming payment transaction;

analyzing a location of a cellular telephone of an owner of said payment card and a location of the store for determining a location rating;

analyzing a location behavior profile (LBP) related to said payment card for determining a behavior rating;

computing a transaction rating using the location rating and the behavior rating in combination with a first weight factor;

analyzing historical payment transactions related to said payment card for determining a card rating; and computing said fraud-score using said transaction rating and said card rating in combination with a second weight factor.

According to a second aspect of the invention, there is provided a method for accurately and adaptively learning the locations of merchants for the purpose of performing location-based analysis of payment transactions, the method comprising:

identifying pairs of payment transactions occurred within a predefined time interval and submitted by different merchants;

for each pair of payment transactions, computing a transaction velocity;

computing a merchant location score (MLS) for each merchant if said transaction velocity is lower than a maximum allowable velocity; and saving the computed MLS of a merchant if its computed MLS is below a maximum value of MLS.

According to a third aspect of the invention, there is provided a method for accurately and adaptively learning in real-time the locations of merchants for the purpose of performing precise location-based analysis of payment transactions, said method comprising:

receiving a payment transaction submitted by a merchant;

obtaining the location of said merchant;

retrieving a plurality of location based services (LBS) locations of one or more mobile phones associated with a user that initiates said payment transaction;

for each of said plurality of LBS locations, increasing a merchant location score (MLS) of said merchant if said merchant location matches said at least one of said LBS locations; and saving said each of said plurality LBS locations as a new location of said merchant if said one of said LBS locations matches the obtained merchant location.

According to a fourth aspect of the invention, there is provided an authentication system for determining a fraud score associated with a monetary transaction facilitated using a payment card in a store, said authentication system comprising:

a transaction processor for processing data representative of an incoming payment transaction for determining said fraud-score based on at least the location of a cellular telephone of an owner of said payment card and a location of a store;

a database for storing incoming payment transactions and fraud scores computed for incoming payment transactions; and a display unit for displaying data representative of processed incoming payment transactions.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

Figure 1:
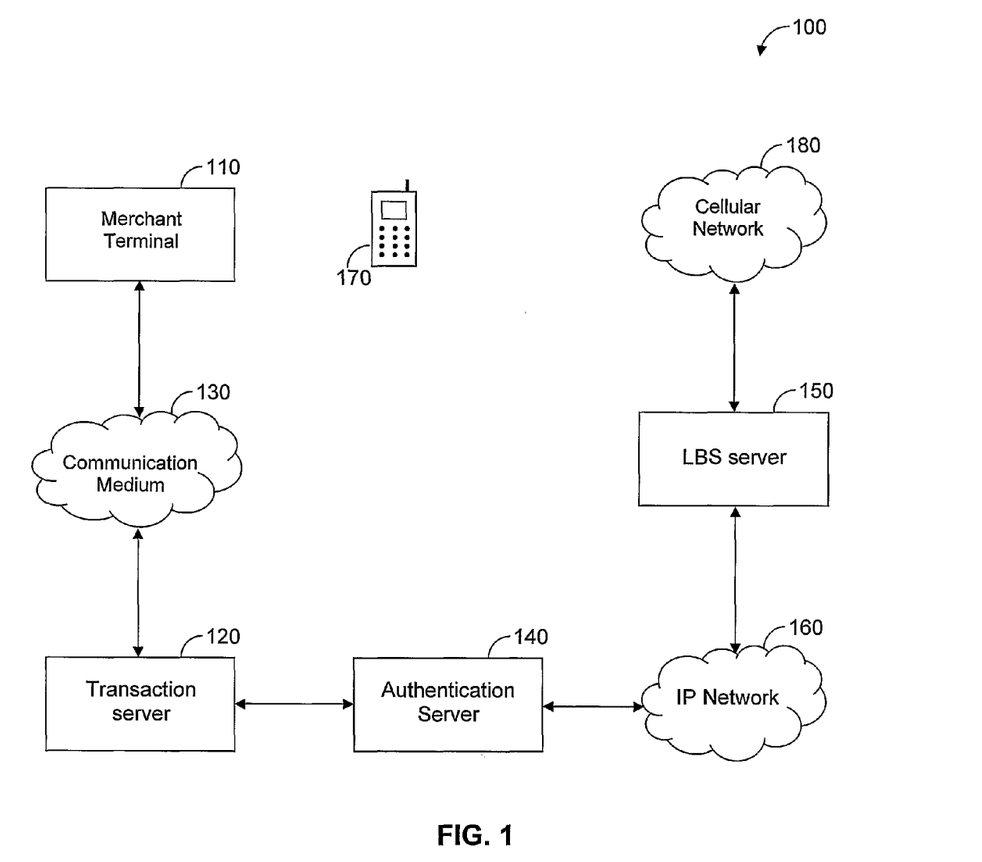
FIG. 1 is a diagram of a network system used to describe the authentication process preformed in accordance with an embodiment of the present invention

FIG. 1 shows a non-limiting diagram of a network system 100 used to describe the authentication process preformed in accordance with an embodiment of the present invention. The network system 100 includes a merchant terminal 110 that communicates with a transaction server 120 through a communication medium 130. The transaction server 120 is coupled to an authentication server 140 which processes incoming transactions as will be described in greater detail below. The connection between the transaction server 120 and the authentication server 140 is established by means of a local area network (LAN). The authentication server 140 receives the location of a subscriber's mobile phone 160 through a location-based-services (LBS) server 150. The LBS server 150 communicates with the authentication server 140 through, for example, an internet protocol (IP) network 160. The LBS server 150 locates a mobile phone 170 in a cellular network 180 to which the card holder subscribes. The location provided by the LBS server 150 may be, but not limited to, a cell ID of the cellular network, GPS coordinates, and the like.

The authentication process carried out by the network system 100 starts with a subscriber (i.e., a credit card holder making a purchase) who initiates a purchasing transaction at the merchant's place of business. Then, the merchant terminal 110 connects with the transaction server 120 and sends to it the transaction information. The transaction information includes, but may not necessarily be limited to, details of the merchant (e.g., merchant's ID, type, name, and address), payment card details (e.g., card number and expiry date), sums to be charged, date of purchase, and so on. The transaction server 120 sends the transaction information to the authentication server 140 for authenticating the transaction. As part of the authentication process, the authentication server 140 generates a location request to the LBS server 150 to locate a mobile phone 170 associated with the card owner. Upon receiving the location of the mobile phone 170, the authentication server 140 performs a series of analyses to authenticate the transaction. Specifically, the authentication server 140 produces a fraud-score that indicates to some extent the reliability of the transaction. Based on the fraud-score, the transaction server 120 decides whether or not to authorize the transaction and produce an alert.

Figure 2:
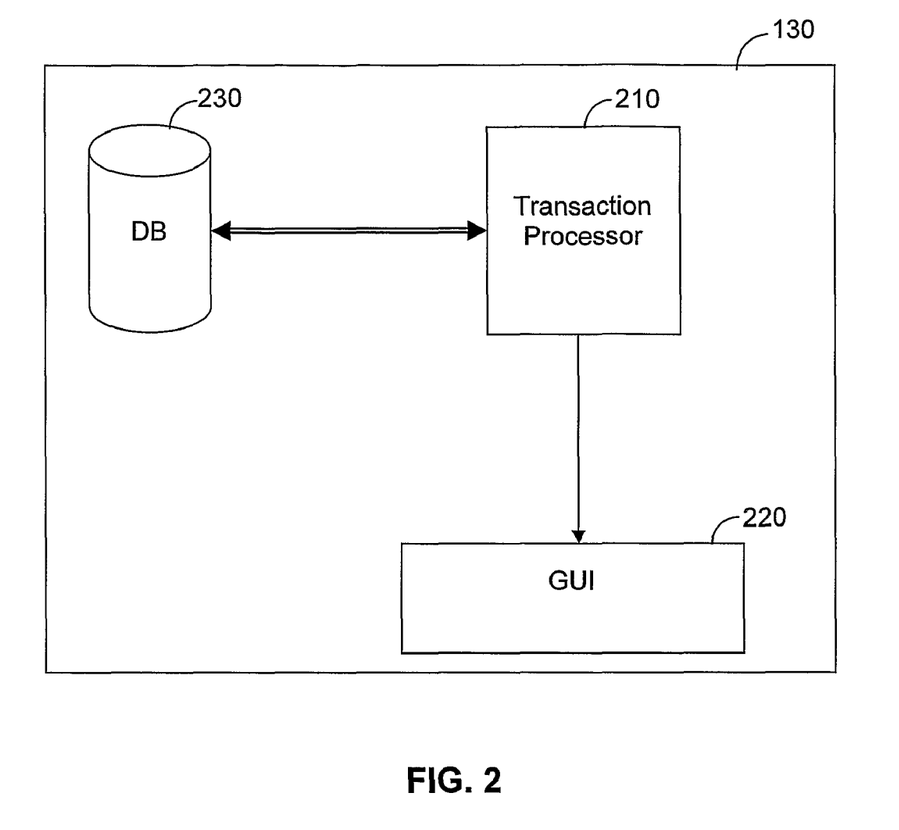
FIG. 2 is a block diagram of an authentication server constructed and operative in accordance with an embodiment of the present invention

FIG. 2 shows a non-limiting block diagram of the authentication server 140 constructed and operative in accordance with one embodiment of the present invention. The authentication server 140 includes a transaction processor 210, a graphical user interface (GUI) 220, and a database 230. The transaction processor 210 performs all activities related to the processing and evaluation of transactions for the purpose of producing the fraud-score. Specifically, the transaction processor 210 receives a transaction processing request from the transaction server 120, sends a request to the LBS server 150 to get the location of a mobile phone 170 associated with the card owner, and performs a series of authentication analyses to determine the fraud-score. The authentication analyses carried by the transaction processor 210 are described in greater detail below with reference to FIG. 3. The transaction processor 210 includes external interfaces to the transaction server 120 and the LBS server 150 as well as internal interfaces to the GUI 220 and the database 230. In one embodiment, these interfaces are proprietary application programming interfaces (APIs). The database 230 stores all the information collected by the authentication server 140, e.g., transactions and locations information as well as processed data, e.g., fraud-scores and generated alerts. The GUI 220 displays data of processed transactions and alerts. The displayed data can be utilized by a system operator for taking a decision as to whether a transaction is fraudulent after the authorization of the transactions.

Figure 3:
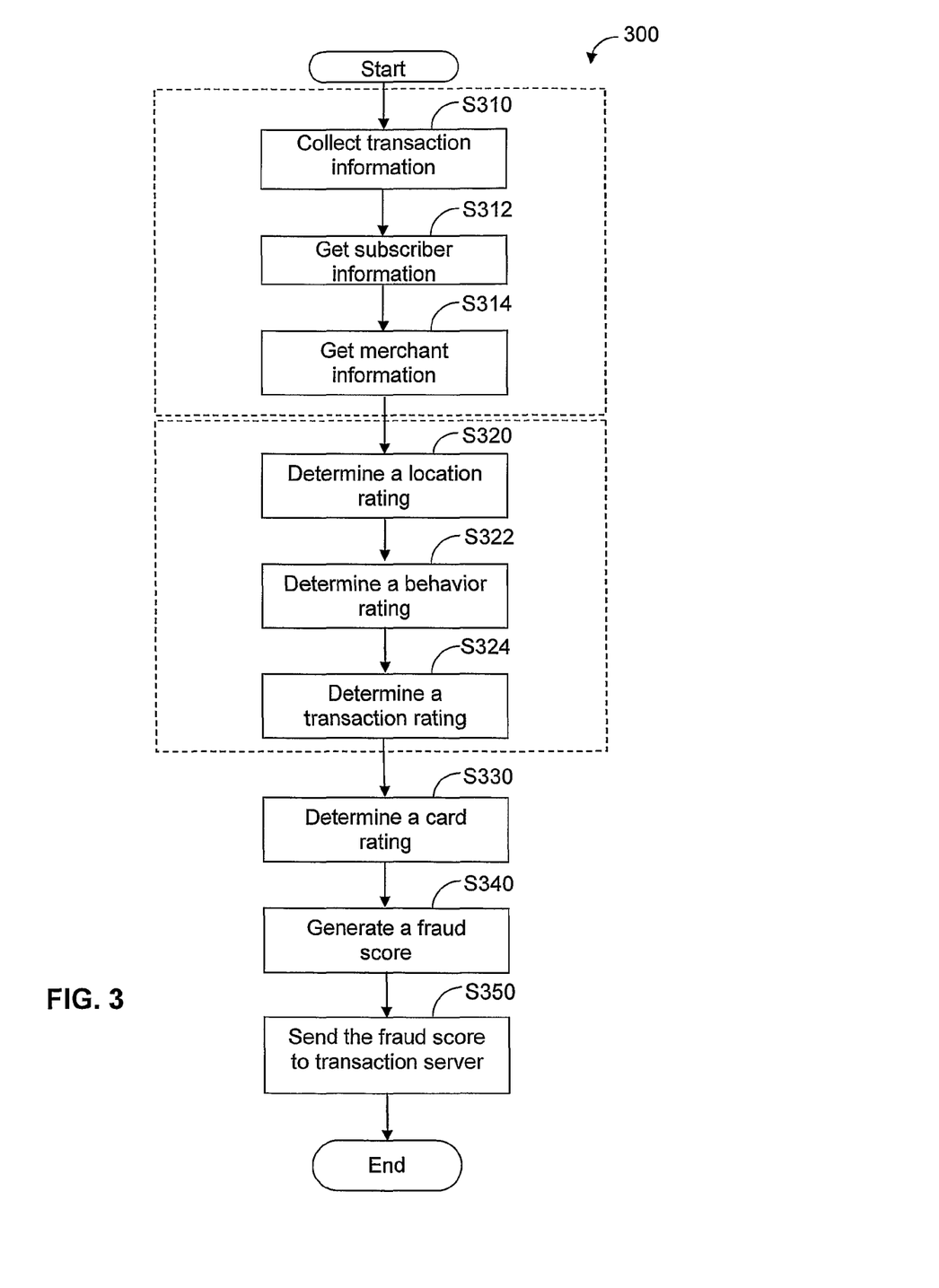
FIG. 3 is a flowchart describing the method for detecting fraudulent transactions in accordance with an embodiment of the present invention

FIG. 3 shows a non-limiting flowchart 300 describing a method for detecting fraudulent transactions in accordance with one embodiment of the present invention. At S310, authentication server 140 collects transaction information sent from the transaction server 120 and saves the data in its database 230. At S312, the subscriber information, including at least the current location associated with a credit card that is used to pay for the transaction or validate the purchaser, is retrieved by sending a LBS request to the LBS server 150. At S314, merchant information including at least its current location is retrieved from the database 230. The geographic location of a merchant is represented in a format that allows for an easy comparison to the location of a mobile phone. For example, the merchant location may be stored as a cell ID of the cellular network, a set of GPS coordinates, and so on. The position of a merchant is dynamically learnt by the authentication server 140 using a learning process described in greater detail below.

At S320, a location rating that indicates if a subscriber is located in proximity to the merchant is generated. The location rating is determined by matching location of the mobile phone 170 associated with the owner of the credit card, as received from the LBS server 150, to the learnt location of the merchant, and generating a location rating that is, in one embodiment of the disclosed invention, a function of the distance between the compared locations. This rating may be generated by normalizing the resultant distance to 1, where a good rating is 1 and a poor rating is 0. In one embodiment of the present invention a cellular analysis is applied if S320 results in a poor rating. This analysis checks if the reason for the outcome rating is the inability to detect the location of the mobile phone (e.g., due to the inactiveness of the phone). Then, it is further checked whether it is a normal behavior for the subscriber not to activate the mobile phone on certain days or in certain locations. For example, the subscriber may shut-off the mobile phone when visiting theaters or museums. If the inability to detect the phone's location is determined as a normal behavior, the location rating may be refined or may be given a lower weight when calculating the final fraud-score.

At S322, a behavior rating is generated. This is performed by detecting deviations from a location behavioral profile (LBP), which characterizes the behavior pattern of both subscribers and merchants, and generates a value proportional to the detected deviations. The resultant value may be normalized to 1, where a good rating is one and a poor rating is 0. As will be described in greater detail below, the LBP includes historical information gathered on each subscriber and merchant with respect to their geographical locations and time periods (e.g., time of day, day of week, and so on) in which transactions were recorded. At S324, a transaction rating is generated. The transaction rating is a function of the location rating and behavior rating. For example, the transaction rating may be a weighted average of both the location rating and behavior rating normalized to 1, where a good rating is 1 and a poor rating is 0.

At S330, a card rating is determined that indicates the number of previous suspected transactions recorded for a specific card of a subscriber. The card rating is determined by accumulating the number of all transactions indicated as suspected, for example, all transactions with a transaction rating below a reconfigurable threshold. The counted number of transactions may be normalized to 1, where a good rating is 1 and a poor rating is 0. At S340, the fraud-score is generated using the computed transaction rating and card rating. The fraud-score is a function of both the transaction rating and card rating and may be, for example, a weighted average of both ratings normalized to 1, where one represents the least suspicious. At S350, the fraud-score is sent to the transaction server 120.

The transaction server 120 authorizes the transaction if the fraud-score is within a trust range; otherwise, the transaction is denied. The upper and lower bounds of a fraud-score are configurable and may be set by a system administrator or automatically determined by the authentication server 120. The computed fraud-score, transaction and card ratings are saved in the database 230.

It will be appreciated by a person skilled in the art that the fraud-score provides a superior advantage over prior art solutions that produce an indication whether to authorize the transaction merely based on the locations of the merchant terminal 110 and a mobile phone 170.

Figure 4:
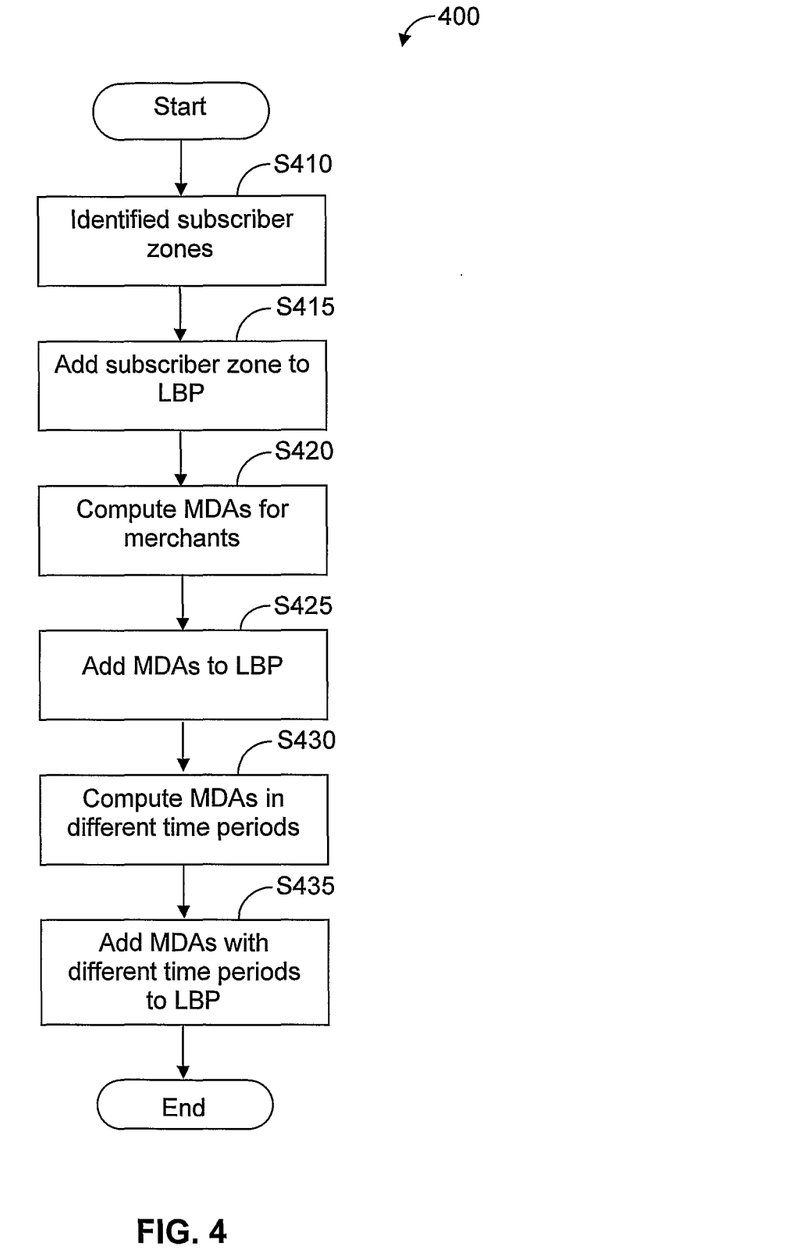
FIG. 4 is a non-limiting and exemplary flowchart describing the process for generating a LBP in accordance with an embodiment of the present invention

FIG. 4 shows a non-limiting flowchart 400 describing the process for generating a LBP in accordance with one embodiment of the present invention. A LBP includes behavior patterns of merchants and subscribers (either for a specific subscriber or a group of subscribers) in respect to geographical regions and time periods. The learning of a behavior pattern is based on statistics gathered on performed transactions. In a pre-processing operation, the method gathers details on any transaction performed by a subscriber or group of subscribers.

At S410, for each subscriber, the geographical regions in which the subscriber performs most of the transactions (hereinafter the "subscriber zones") are identified. Each subscriber zone defined by a group of merchants (i.e., places of business a transaction took place at) relatively located in the same distance region and the number of transactions above a pre-defined threshold associated with each such merchant. The distance region is defined as the maximum distance between each pair of merchants in a subscriber zone. At S415, the location (e.g. a set of GPS coordinates) of each identified subscriber zone is added to the LBP of the respective subscriber zone. At S420, for each merchant, the minimal average distance (MAD) between subscribers and their respective subscriber zones is computed. For example, subscribers X, Y and Z are respectively related to subscriber zones A, B and C and the minimal distances from a merchant-1 (i.e., where the purchases were made) to subscriber zones A, B and C are respectively 10 km, 15 km, and 2 km. In such a scenario the MAD of merchant-1 is 9 km. The MAD may be significantly different from one merchant to another, as the types of businesses are different. For instant, the MAD computed for a hotel may be higher than the MAD computed for a local grocery store. At S425, the MAD computed for each merchant is added to the profile. At S430, for each merchant the MAD is computed for different profiles of transactions or cards for instance time periods, amount, type of card etc., i.e., using transactions recorded in designated time periods. The time periods may be, but are not limited to, time of day, day of week, holidays, sessions, and so on. As a non-limiting example, a LBP may include MADs computed for a grocery store in two different time periods: Saturdays and Sundays between 10 AM and 12 PM as well as Mondays through Thursdays between 2 PM and 6 PM. At S435, the MADs computed at S430 are saved together with their respective time periods in the LBP.

Other statistics related to transactions performed in respect to the subscriber zones may be computed and added to the LBP. These statistics include, but are not limited to, average amount of purchases where the distance between the merchant and a subscriber zone is less than a pre-defined distance, e.g., the distance between a subscriber zone is between 10-15 km, standard deviation of the MAD between the merchant and a subscriber zone, and so on. As mentioned above, the LBP is utilized for detecting a fraudulent transaction by identifying any deviation from data stored in the MAD.

Figure 5A:
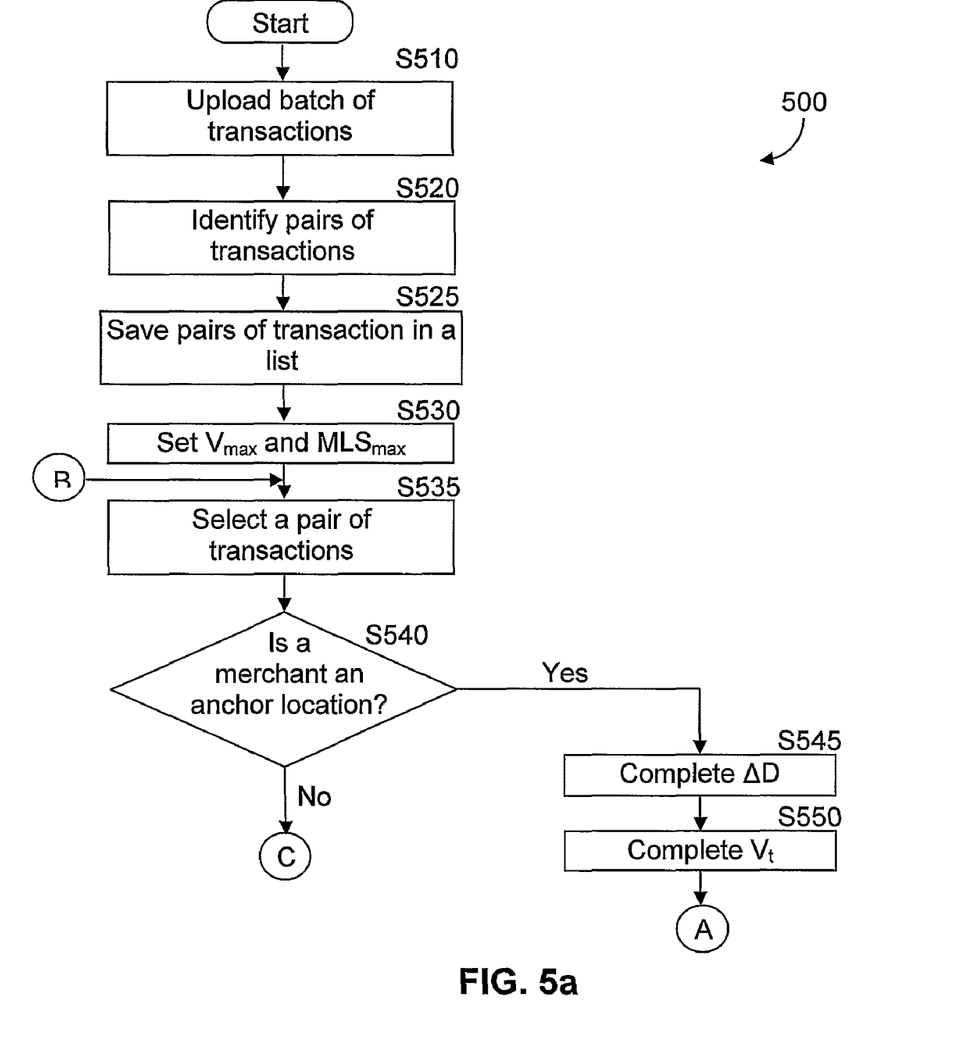
FIG. 5 is a flowchart describing the method for learning the location of merchant terminals in accordance with one embodiment of the present invention
Figure 5B:
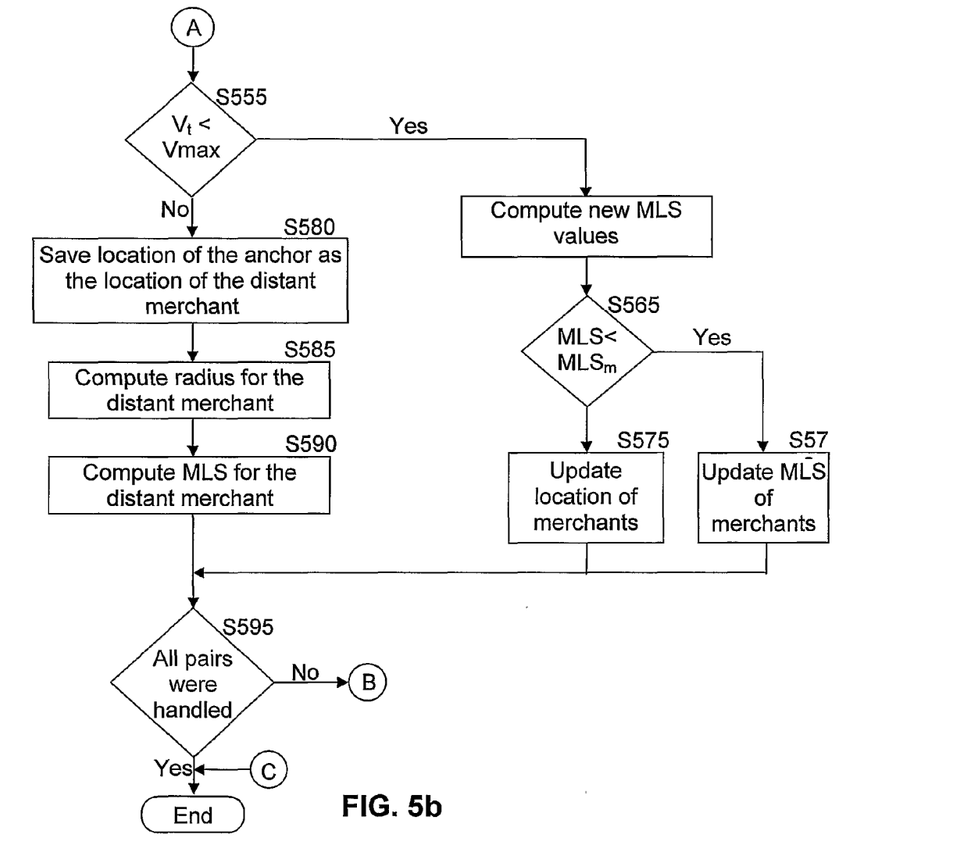

FIG. 5 shows a non-limiting flowchart describing a method for accurately and adaptively learning the locations of merchants in accordance with an embodiment of the present invention. The learning process allows precise location-based analysis of payment transactions to be performed.

The authentication server 140 holds and constantly updates a lookup table, in the database 230, of the locations of all possible merchants 110 in a specific area. At S510, a batch of historical payment transactions sent from merchants is uploaded to the authentication server 140. A payment transaction is a request sent from a merchant terminal 110, to the transaction server 120, for authorizing the transaction. As mentioned above, all transactions are recorded by server 120. At S520, all pairs of historical transactions that occurred within a pre-defined time interval and performed by the same card holder are identified. This is performed in order to determine if transactions of each such pair can be paired. At S525, the identified pairs of transactions are saved in a list (hereinafter the "pair list"). At S530, the variables' maximum acceptable velocity ("Vmax") and maximum merchant location score ("MLSmax") are set to their initial values, e.g., 80 kph and 100 kph respectively. A merchant whose calculated MLS is above MLSmax is considered as an 'established' location.

At S535, a pair of transactions is selected from the pair list. At S540, it is checked if at least one of the merchants who submitted transactions in the selected pair is considered as an anchor location. An anchor location is a location that was verified and considered accurate, i.e., a location with a relatively high MLS. If S540 results with an affirmative answer, execution continues with S545; otherwise, execution ends. If none of the merchants is considered as an anchor location, then a process for updating the MLS of each merchant is applied. One example for such process is described below with reference to FIG. 6. Another process that may be used for updating the MLS is the method described herein, where in this case, execution proceeds to S545 regardless to the results yielded at S540.

At S545, the distance between the merchants ("ΔD") is computed. At S550, a transaction velocity (Vt) is computed. Vt is equal to ΔD divided by a time interval ΔT between transactions in the selected pair. For example, if a pair of transactions associated with merchants A and B is performed in a time interval ΔT and the distances between merchants A and B is ΔD, then Vt is computed as follows:

$$V_t = \frac{\Delta D}{\Delta T}.$$

At S555, it is checked if $V_t$ is lower than Vmax, and if so execution continues with S560 where a new value of MLS is computed for each of the merchants. Specifically, the MLS of the first and second merchants $MLS_A$ and $MLS_B$ are computed as follows:

$$MLS_A = MLS'_A + \frac{V_{max} - V}{V_{max}} * MLS_B; \text{ and}$$

$$MLS_B = MLS'_B + \frac{V_{max} - V}{V_{max}} * MLS_A.$$

The MLS' is the previous score assigned to each merchant location. This score may be a default or pre-computed value. At S565, it is checked if a MLS computed for each merchant is below the value of MLSmax, and if so execution continues with S570 where a MLS value or values below MLSmax are saved in their respective entries in the lookup table. If the operation in S565 results with a negative answer, then at S575, the coordinates of the anchor location are saved as the location of a merchant with MLS greater than MLSmax. The new computed MLS of each such merchant is also saved.

Execution proceeds to S580 if the result of S555 yields that Vmax is higher than Vt. At S580, the location coordinates of the merchant which is the anchor location are saved as the location of the second merchant (hereinafter the "remote merchant"). At S585, a radius for the remote merchant is computed and added to the lookup table in the respective entry. The radius is computed as follows:

$$\text{Radius}D = \text{Radius}C + TDFC;$$

where, TDFC is a difference factor that equals to ΔT*Vmax and RadiusC is the radius of the anchor location. At S590, a new MLS is calculated for the remote merchant as follows:

$$MLSD = \beta * MLSC$$

where, MLSC is the score of the merchant considered as the anchor location and β is a configurable parameter that may vary, for example, between 0.1-0.2. The new computed MLS is added to the lookup table. At S595, it is checked if all pairs of transactions in the pair list were handled, and if so execution terminates; otherwise, execution returns to S535.

Figure 6:
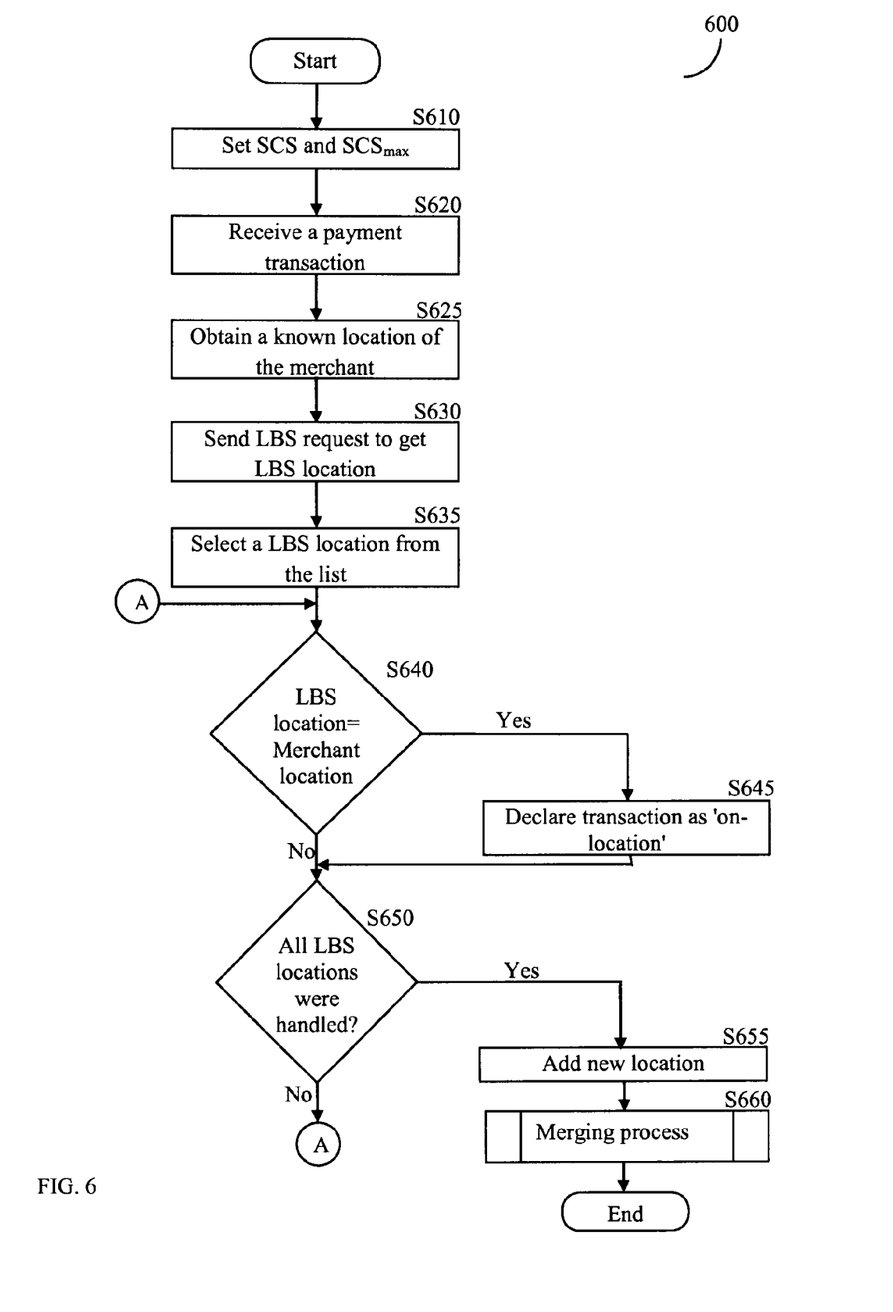
FIG. 6 is a flowchart describing the method for updating and learning the location of merchant terminals in accordance with another embodiment of the present invention.

FIG. 6 shows a non-limiting flowchart 600 describing a method for updating and learning the locations of merchant terminals, in accordance with one embodiment of the present invention. The method updates and learns new locations in real-time, i.e., as payment transactions received at the authentication server 140 from the transaction server 120 actually take place. Specifically, the method updates the MLS and the status of each merchant in the lookup table using LBS information retrieved from the cellular network 180 through the LBS server 150.

At S610, a subscriber-cellular score (SCS) and a maximum SCS ("SCSmax") are set to their initial values. The SCS provides an indication if the mobile phone 170 of a user can be indicative of his location. For example, on the one hand, if a user always carries his phone then the SCS may be set to a higher value; on the other hand, if the user rarely carries his phone, the SCS may be set to a lower value. The SCS may be a function of a number of prior 'on-location' transactions. The SCS and SCSmax are relevant only if a user has two or more mobile phones. In the case that a user has only a single phone the SCS and SCSmax are set to 1.

At S620, a payment transaction sent from a merchant terminal 110 is received at authentication server 140 (through the transaction server 120). A transaction carries information that includes, but may not necessarily be limited to, details of the merchant (e.g., merchant's ID, type, name, and address), payment card details (e.g., card number and expired date), sums to be charged, date of purchase, and so on. At S625, the known location of the merchant that initiates the transaction is obtained from the lookup table in database 230. At S630, the authentication server 140 generates a location request to the LBS server 150 to locate each of the user (i.e., card holder) mobile phones. Specifically, first the authentication server 140 gets from database 230 a list of phone numbers of the user and send a LBS request to one or more cellular networks to retrieve the mobile phones' locations (hereinafter the "LBS locations"). All LBS locations are kept in a LBS locations list. At S635, a single LBS location is selected from the list. At S640, it is checked if the chosen LBS location matches the merchant location as retrieved at S625, and if so execution proceeds to S645 where the incoming transaction is declared as 'on-location' and the MLS of the merchant is increased; otherwise, execution continues S650. The transactions declared as 'on-location' can be used later for determining the SCS of the user mobile phone. The new MLS is set to:

$$MLS = MLS' + \lambda * \frac{SCS}{SCS_{max}}$$

where MLS' is the previous score assigned to a merchant and λ is a configurable parameter.

At S650, is it checked if all LBS locations in the list were handled; and if so execution continues with S655 where a new merchant location is added to the lookup table; otherwise, execution returns to S635. A new location is added only if none of the user's mobile phones is 'on-location'. Specifically, at S655, each of the LBS locations in the list is added to the lookup table. For each such location, a set of coordinates as well as the radius of the LBS location are saved. Furthermore, a MLS is computed and added to the table. The MLS is computed as follows:

$$MLS = \frac{SCS}{SCS_{max}} * \alpha$$

where the parameter α is configurable, e.g., α may be set to a value of 1000. It should be noted that a newly created merchant location is not necessarily valid, i.e., is an 'un-established' location. In order for the location to be considered as established and trusted, it needs to be confirmed by the LBS locations of a configurable number of other card holders e.g., two card holders.

At S660, once one or more locations are created, a merging process takes place to eliminate duplicate newly created locations covering same areas. Specifically, the merging process compares all merchant locations of each merchant and identifies groups of two or more locations which cover the same area. Once a group is identified, all the relevant merchant locations are merged into one inclusive location. The MLS of the merged location is the sum of the original locations' scores. In a case where at least one of the merged locations is an established location, the merged location is also considered established.

After executing the real-time learning process, the transactions coupling process (described above with reference to FIG. 5), or a cleaning process, can further be performed to ensure a higher level of accuracy. The cleaning process comprises checks that all merchant locations are valid and no duplicates exist. The process checks all the merchant locations' scores and update dates. If the update date is older than a configurable expiration date the merchant location is purged. An 'un-established' merchant location can also be purged if its date is older than a configurable semi-expiation date and its MLS is less than a configurable semi-expiration score.

It will be understood that while the invention has been described with regard to payment using a credit card, actual payment may be made by other means and the purchaser's credit card may be used only to authenticate the purchaser. For example, once it is established that the purchaser's location, as identified by his cellular telephone for example, is within correct proximity of the merchant, payment itself can be charged to the purchaser's cellular telephone bill or to another charging account associated with the purchaser.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for accurately and adaptively learning the locations of merchants, comprising:
   identifying, by an authentication server, pairs of payment transactions which occurred within a predefined time interval and are submitted by different merchants, wherein payment transactions are recorded by a transaction server and the identification occurs as payment transactions are received at the authentication server;
   setting, by an authentication server, a maximum allowable velocity and a maximum merchant location score (MLS-max) to their respective initial value;
   for each pair of payment transactions, computing, by an authentication server, a transaction velocity;
   computing a merchant location score (MLS) for each merchant that submitted a payment transaction in the each pair of payment transactions, if said transaction velocity is lower than a maximum allowable velocity;
   setting a location of a merchant of each of the merchants to a location of an anchor location, if said MLS computed for the merchant is above a maximum value of MLS;
   saving the computed MLS of a merchant if its computed MLS is below the maximum value of MLS; and
   saving, by the authentication server, the location of the merchant in a database, thereby the authentication server adaptively updates the database with the locations of merchants in a specific area as payment transactions are received from the transaction server.

2. The method of claim 1, further comprising:
   setting the location of the merchant according to the location of the anchor location if at least one of the following conditions is satisfied: at least one of said merchants is at said anchor location and said transaction velocity is higher than said maximum allowable velocity.

3. The method of claim 2, wherein said anchor location is a verified and accurate location.

4. The method of claim 2, wherein said location and MLS of each merchant are saved in a lookup table.

5. The method of claim 2, where said location of each merchant is used to determine whether payment transactions should be authorized when performing a location-based analysis.

6. A computer readable medium having stored thereon instructions executable by the computer to perform a process for accurately and adaptively learning the locations of merchants, the process comprising:
   identifying pairs of payment transactions which occurred within a predefined time interval and are submitted by different merchants, wherein payment transactions are recorded by a transaction server and the identification occurs as payment transactions are received;
   setting a maximum allowable velocity and a maximum merchant location score (MLSmax) to their respective initial value;
   for each pair of payment transactions, computing a transaction velocity;
   computing a merchant location score (MLS) for each merchant that submitted a payment transaction in the each pair of payment transactions, if said transaction velocity is lower than a maximum allowable velocity;

setting a location of a merchant of each of the merchants to a location of an anchor location, if said MLS computed for the merchant is above a maximum value of MLS;

saving the computed MLS of a merchant if its computed MLS is below a maximum value of MLS; and saving the location of the merchant in a database, thereby adaptively updating the database with the locations of merchants in a specific area as payment transactions are received.

* * * * *

UNITED STATES PATENT AND TRADEMARK OFFICE
CERTIFICATE OF CORRECTION

| | | |
|---|---|---|
| PATENT NO. | : 8,285,639 B2 | Page 1 of 1 |
| APPLICATION NO. | : 11/994977 | |
| DATED | : October 9, 2012 | |
| INVENTOR(S) | : Tomer Eden and Boaz Avigad | |

It is certified that error appears in the above-identified patent and that said Letters Patent is hereby corrected as shown below:

On the title page, item 60, line 1:

Provisional application No. 60/695,893, filed on Jul. 5, "-2006-" should read --2005--

Signed and Sealed this
Twenty-eighth Day of January, 2014

Michelle K. Lee
*Deputy Director of the United States Patent and Trademark Office*